United States Patent [19]

Edvardsson

[11] Patent Number: 4,665,403

[45] Date of Patent: May 12, 1987

[54] METHOD AND APPARATUS FOR LEVEL MEASUREMENT WITH MICROWAVES

[75] Inventor: Kurt O. Edvardsson, Linköping, Sweden

[73] Assignee: Saab Marine Electronics Aktiebolag, Gothenburg, Sweden

[21] Appl. No.: 737,529

[22] Filed: May 24, 1985

[30] Foreign Application Priority Data

Jun. 1, 1984 [SE] Sweden ................................ 8402960

[51] Int. Cl.⁴ ............................................. G01S 13/08
[52] U.S. Cl. ...................................... 342/124; 342/172
[58] Field of Search .................. 343/5 TM, 12 R, 14, 343/17.7; 73/290 R, 290 B, 291; 342/120-124, 127-132, 134, 135, 145, 165, 169-174

[56] References Cited

U.S. PATENT DOCUMENTS

| | | | |
|---|---|---|---|
| 3,428,815 | 2/1969 | Thompson | 343/12 R X |
| 3,888,588 | 6/1975 | Granqvist | 343/12 R X |
| 4,044,353 | 8/1977 | Levy | 343/12 R |
| 4,044,355 | 8/1977 | Edvardsson | 343/14 |
| 4,106,020 | 8/1978 | Johnson | 343/14 |
| 4,245,221 | 1/1981 | Kipp et al. | 343/17.7 |
| 4,360,812 | 11/1982 | Peperone | 343/14 |
| 4,569,599 | 2/1986 | Bölkow et al. | 343/12 R X |

Primary Examiner—Thomas H. Tarcza
Assistant Examiner—Bernarr Earl Gregory
Attorney, Agent, or Firm—James R. Custin; James E. Nilles

[57] ABSTRACT

The invention concerns a method and an apparatus for measuring the level of a material with microwave signals. The apparatus consists of a signal processing unit (10) and a transmitter unit (1) of known type. The transmitter unit produces a measuring signal having a frequency ($f_m$) corresponding to the distance (H) to be measured and a reference signal having a frequency ($f_r$) corresponding to an accurately known length (L). In the signal processing unit (10) the reference signal is multiplied by a selectable number (AQ) which is proportional to the quotient of an assumed value for the distance divided by the known length (L), after which the frequency is divided by a fixed number (Z) so that the frequency of the signal after multiplication and division becomes equal to the expected frequency of the measuring signal. Thereafter the control signal thus produced is mixed with the measuring signal, for determination of the phase difference between them, which is sampled in each of a succession of regular sampling intervals, and the change in phase difference through the successive sampling intervals is calculated for determining a correction term for the assumed distance.

11 Claims, 3 Drawing Figures

METHOD AND APPARATUS FOR LEVEL MEASUREMENT WITH MICROWAVES

The present invention relates to a method for measuring the distance from an antenna to the surface of a fluent material such as a liquid or a particulate solid material with the use of a microwave signal, the frequency of which varies substantially linearly during a measuring interval and one part of which is emitted from the antenna towards the surface to be reflected therefrom and, after a propagation time corresponding to the sought distance, to be received and mixed with the signal which has been emitted at that instant, so that a measuring signal with a measurement frequency dependent upon the sought distance is obtained. More specifically the invention relates to such a method wherein another part of the emitted signal is received after being subjected to a delay corresponding to a known length, and in an analogous manner is converted to a reference signal with a reference frequency corresponding to the known length, whereupon the relationship between the measurement frequency and the reference frequency enables the sought distance to be calculated on the basis of the known length. The invention further relates to an apparatus for performing the method.

The above described method is employed especially for measuring the level of the contents of tanks, cisterns and the like. A problem in such measuring is to determine the measurement frequency accurately and to separate out disturbing reflections that originate from, for example, supporting beams or the bottom of the tank. In apparatus according to U.S. Pat. No. 4,044,355 this problem is solved by converting the reference and measuring signals to respective sets of pulse signals. Thereafter a quotient between these two sets of pulse signals is formed, wherein only the relative order of the pulses is of significance. In forming the quotient there is employed a weight factor that varies during the measurement interval. The weight factor involves determination of the quotient between the measuring and reference signals by the method of least squares, which provides good accuracy of calculation after only one measurement interval.

This method, however, is not suitable for level measuring where the microwave signal is propagated in a pipe extending downwardly through the tank, as is necessary in certain storage structures, as for example large cisterns with so-called floating roofs. The above mentioned measuring method, in particular, is premised upon the pattern of frequency variation of the emitted microwave signal through the sweep remaining unchanged from its emission through its reflection and until it is received. But in a pipe the frequency of the signal may be altered in dependence upon the diameter of the pipe, and the velocity of propagation of the microwave signal, which is slightly lower than in free air, is frequency dependent and is therefore also dependent upon the diameter of the pipe. Hence when the above described method is used for measuring in a pipe the obtained value for the distance will be too large. A direction correction can be made if pipe diameter is accurately known; but pipe diameter is in practice difficult to measure with satisfactory accuracy, inasmuch as the pipe may consist of welded-together pipe pieces with somewhat different diameters, or it may have an interior oil film that causes some apparent change of diameter.

The object of the present invention is accordingly to provide a method of measuring a level with microwaves, which method affords very good measuring accuracy even for measurements in a pipe. Another object of the invention is to provide an apparatus for carrying out the method.

According to the present invention the reference signal is processed in such a manner that there is formed a control signal which defines a waveform analogous to that of the reference signal but which has a frequency that is proportional to the quotient relationship between an assumed value for the sought distance to the surface (level in the tank) and a known length, that is, the control signal is caused to have a frequency approximately equal to the expected measuring frequency. The control signal is mixed with the measuring signal in such a manner that two low frequency beats are obtained that are 90° out of phase with one another. The frequency of each of the beats is the difference frequency between the control signal and the measuring signal and is thus a measure of the accuracy of the assumed relationship between the sought distance (tank level) and the length of the known distance. The beats are A/D converted and are employed for calculating the change in phase difference between the control signal and the measuring signal during a measurement interval that constitutes a predetermined portion of a sweep. From this change in phase difference, finally, a correction term for the assumed level can be calculated, whereby the sought distance can be obtained.

The advantage of this signal processing is that when measuring in a pipe one can determine the distortion in measuring that is due to non-uniformities in the diameter of the pipe and can thereby automatically correct the measured value so that the influence of the pipe upon the measured value is eliminated. Another advantage of the invention is that the apparatus for performing the method is relatively inexpensive.

The present invention will now be described more specifically with reference to the accompanying drawings which illustrate what is now regarded as a preferred embodiment of apparatus according to the invention and wherein.

Figure 1:
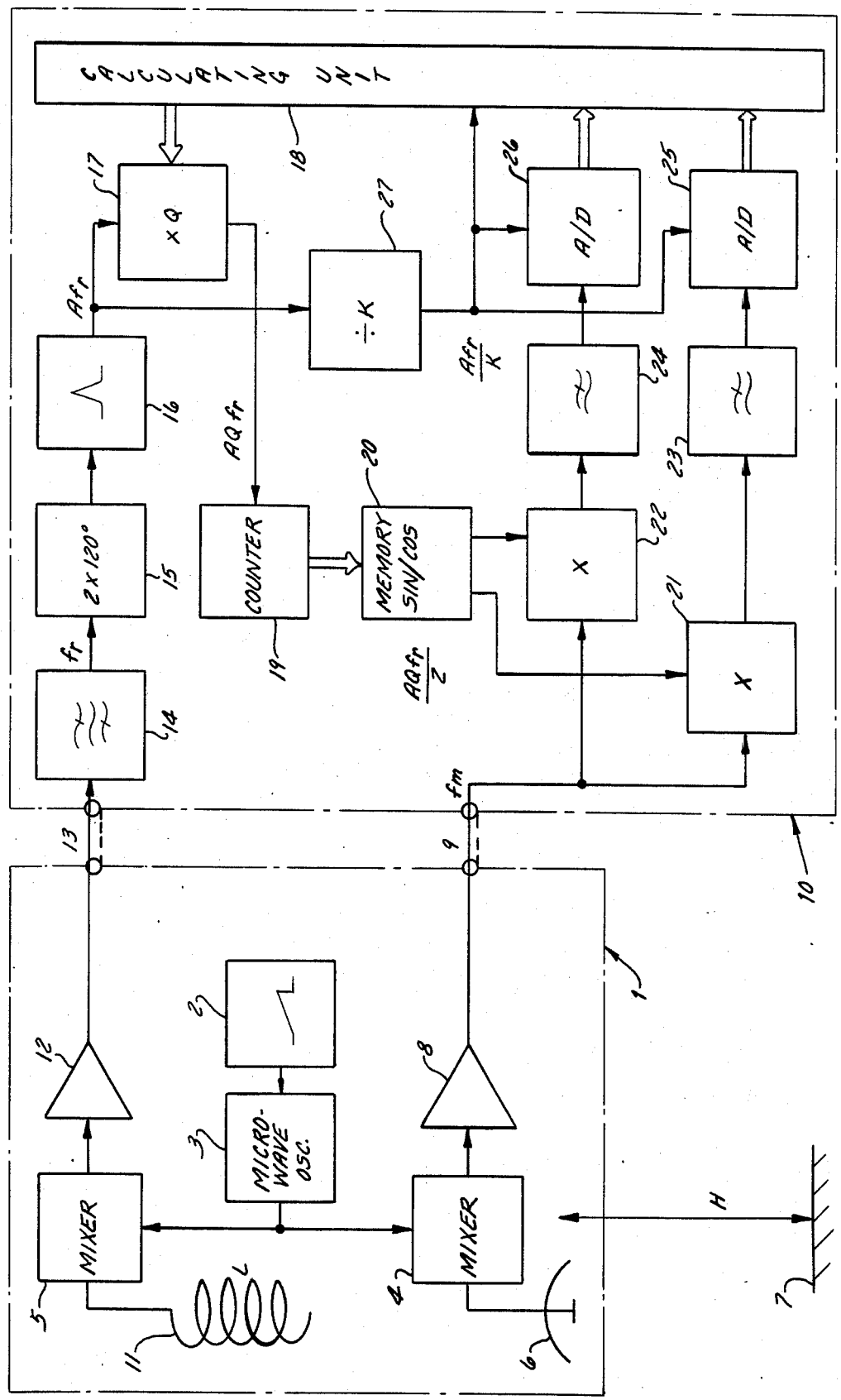
FIG. 1 is a block diagram of the apparatus as a whole.

In the drawing a transmitter unit, designated generally by 1, comprises in a known manner a sweep generator 2 which is coupled to a microwave oscillator 3, the output of which is connected in part to a first mixer 4, in part to a second mixer 5. The first mixer is connected with an antenna 6 that is installed in the upper portion of a container (not shown) for holding a fluent material. The antenna is directed vertically downward so that it radiates to the material surface 7, to which the distance H from the antenna 6 is to be determined. The mixer 4 is also connected by way of an amplifier 8 with an output terminal 9 of the transmitter unit.

The microwave oscillator 3 produces with the aid of the sweep generator 2 an essentially linear single or periodically repeated frequency sweep around a carrier frequency which can for example be 10 GHz. During this sweep the frequency varies monotonally, that is, it changes substantially steadily and only in one direction, either increasing or decreasing through the sweep. The following description covers relationships during a single sweep unless the contrary is stated.

The microwave signal, modulated as just described, is sent out by the antenna 6 and is reflected by the surface 7 back to the antenna, whereafter it is mixed in the mixer 4 with the signal that is at the moment being emitted from the oscillator 3. By this mixing there is produced a measuring signal with a measuring frequency $f_m$ that is proportional to the sought distance H to the material surface 7. The proportionality constant can typically be of the order of magnitude of 100 Hz/m. The measuring signal is thereafter amplified in the amplifier 8 before it is sent on to a signal processing unit which is generally designated by 10.

To compensate for nonlinearities in the microwave oscillator and variations in the sweep rate, the output signal from the microwave oscillator 3 is also emitted to a reference line 11 operating as a delay device which is connected to the second mixer 5. The reference line, which will represent an accurately known length L, ought to be as long as possible, bearing in mind, however, that its damping should not be too large. By the same procedure that takes place with that part of the microwave signal that is sent out by the antenna 6, the reference line 11 reflects back to the mixer 5 the part of the signal that is fed to it, and, with a delay corresponding to the propagation time in the line, that signal portion is mixed in the mixer 5 with the microwave signal being directly emitted from the oscillator 3. As a result of this mixing there is obtained a reference signal having a frequency $f_r$, hereinafter designated the reference frequency, that corresponds to the known distance, that is, the length L of the reference line 11. The reference signal is amplified in an amplifier 12 and is thereafter fed by way of a second outlet 13 from the transmitting unit to the signal processing unit 10.

The signal processing unit 10, which can be physically located at a different place than the transmitting unit, with shielded leads used for coupling the units, comprises in the illustrated embodiment a narrow band filter 14 which is connected with a multiplier instrumentality 17 by way of a phase shifter 15 with, for example, 2×120° phase shifting and a comparator network 16 that includes a pulse former. The multiplier instrumentality 17 is controlled from a calculating unit 18 which, for example, can comprise a microcomputer, and its output is fed to a counter 19 that is coupled to a memory 20 in which sine and cosine values are stored. The memory has two output terminals, one for sine values, the other for cosine values, each connected to a mixer 21, 22, respectively. Each said mixer, in this embodiment, comprises a D/A converter having an input terminal for voltage reference that receives the measuring signal from the outlet 9 of the transmitting unit 1. Each of the mixers-D/A converters 21, 22 is connected in one of two identical branches that are coupled to the calculator unit 18. Each branch comprises, in addition to the D/A converter 21, 22, respectively, a low pass filter 23, 24, respectively, and an A/D converter 25, 26, respectively. The A/D converters 25, 26 receive at their clock inputs sampling pulses that are taken from the output of the pulse former 16 by way of a division circuit 27.

The reference signal with the frequency $f_r$ that is received by the signal processing unit 10 from the transmitter output terminal 13 is passed through the narrow band filter 14, which filters out disturbances and overtones. With the aid of the phase shifter 15 and the comparator network 16 that includes a pulse former, the reference signal is converted to a pulse train, that is, a sequence of reference pulses, the frequency of which is A times higher than the frequency $f_r$ of the incoming reference signal. The number A is a fixed integer so chosen that the frequency $Af_r$ is considerably higher than the highest components of the measuring frequency $f_m$ in order to ensure good filtering. If the phase shifter 15 is for 2×120°, the number A can have the value 12. This frequency increase, which corresponds to an apparent increase in the length of the reference line, can naturally be effected in many ways, but it is important that no delay or distortion be introduced.

Figure 2:
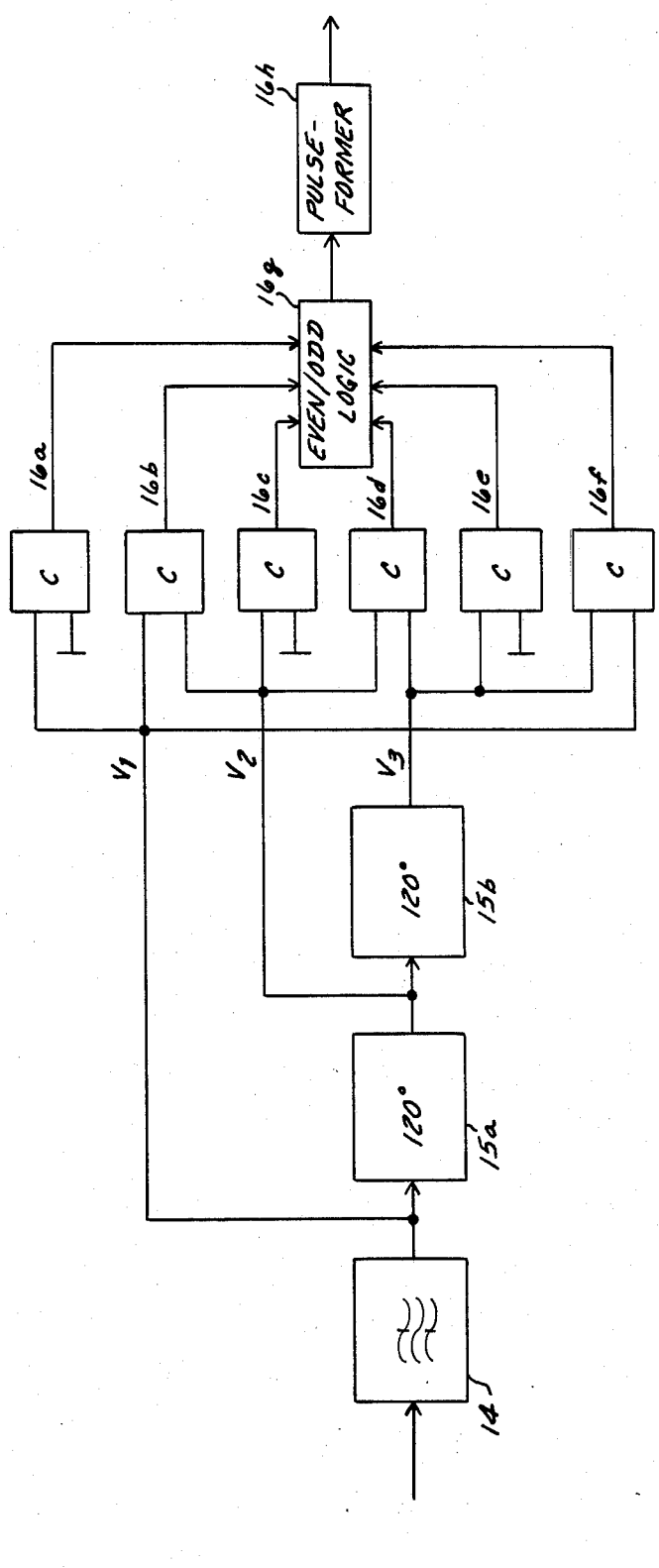
FIG. 2 is a more detailed block diagram of the part of the apparatus comprising the phase shifter and the comparator network that includes a pulse former by which the reference signal is digitized and frequency multiplied by a constant whole number.
Figure 3:
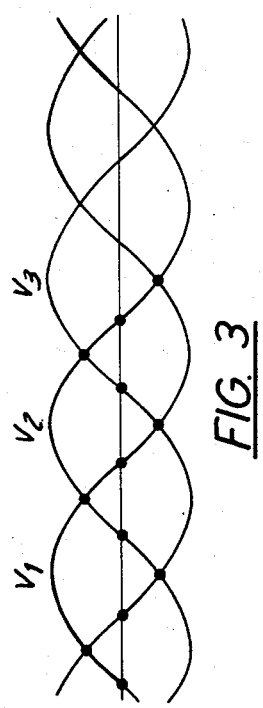
FIG. 3 is a graph of the output of the phase shifter.

In more detail, as can be seen from FIG. 2, the reference signal, after filtration through the narrow band filter 14, is passed through two cascaded 120-degree phase shifters 15a and 15b, to produce the three-phase triplet illustrated in FIG. 3, having the voltage components V1, V2 and V3. Each phase shifter 15a, 15b comprises an operational amplifier with low-pass feedback. From FIG. 3 it can be seen that during each period of the three-phase triplet, twelve points can be found, at equal time intervals, at which voltages of triplet components V1, V2, V3 are equal to one another or to zero. To the output of the filter 14 and the respective outputs of the phase shifters 15a and 15b six voltage comparators 16a–16f are connected, as shown in FIG. 2, to compare the voltage of each triplet component with a reference (zero) voltage and with the voltage of each of the other components. The output of each comparator 16a–16f is a square wave, so that each comparator produces an output which is alternately high and low; and the six square wave outputs of the comparators differ from one another in phase so that at any given instant certain of the comparators are producing a high output and the rest are producing a low output. The outputs of the comparators 16a–16f are fed to an even/odd logic device 16g, which produces a low output if an even number of the six comparator outputs are high and produces a high output if an odd number of the comparator outputs are high. The output of the even/odd logic device 16g is fed to a monostable circuit or pulse former 16h which produces a short pulse for each change of state of the output from the logic device 16g. In this way the reference signal is digitized and frequency multiplied by twelve to produce the reference pulse train having the frequency $Af_r$, which closely imitates any changes in the frequency of the reference signal.

The reference pulses at the frequency $Af_r$ are fed to the multiplier 17 which gives off Q individual pulses for every pulse in the pulse train. The number Q is a variable whole number, determined in the calculating unit 18 with the employment of the previous measurement result. The pulse train issuing from the multiplier 17, which accordingly has a frequency of $f_r \times A \times Q$, is fed to the counter 19. For each pulse fed to the counter 19 that counter emits a binary output which forms an address to the memory 20. In the memory there is, as mentioned above, a table of values for sines and cosines taken for a large number Z of angles taken at substantially regular intervals around a full 360° cycle. The number Z is a power of 2 and can be, for example, 256. After the counter 19 has issued Z binary outputs it starts a new cycle.

The functioning of the memory 20 is such that each time it is addressed, a binary output that corresponds to the table's sine value for the corresponding address is given off at its one output, for example the output to the mixer 21, and a binary output that corresponds to the table's cosine value is given off at its other output, for example to the mixer 22. The sequence of binary outputs to each of the mixers-A/D converters 21, 22 constitutes a control signal, and the frequency of the sinusoidal wave form signified by each of these control signals equals the above mentioned pulse train frequency, $f_r \times A \times Q$, divided by Z. This frequency $AQf_r/Z$ is hereinafter designated the control frequency.

The control signals in binary form that issue from the memory 20 are in this case converted to analogue signals in the respective D/A converters 21, 22, to facilitate comparison with the analogue measuring signal at the the outlet 9 of the transmitter unit. Because Z is a large number (e.g., 256) the control signal outputs of the A/D converters define numerous closely spaced points along a sinusoidal waveform and thus the binary form outputs from the memory 20 can be regarded as fairly smooth. The D/A converters 21, 22, in functioning as mixers, serve as multipliers wherein the measuring signal at the output terminal 9, having the measuring frequency $f_m$, is used as a reference voltage. The outputs of the D/A converters 21, 22 are respectively filtered in low pass filters 23, 24.

The frequency of each low-pass-filtered signal amounts to a difference frequency as between the control frequency $AQf_r/Z$ and the real measuring signal frequency $f_m$, or, stated another way, equals the sine or cosine, respectively, of the phase angle $\phi$ between the control frequency wave form and the measuring signal.

The variable number Q, which is determined on the basis of the measurement result obtained from the preceding sweep, is a whole number of such an order that the control frequency $AQf_r/Z$ corresponds to an assumed measurement frequency. If the distance H in the container changes slowly, as will usually be the case, Q can be tested to the whole number which brings the control frequency $AQf_r/Z$ most nearly into correspondence with the measuring frequency $f_m$, and then the phase shift as between the control signal and the measuring signal during a whole sweep becomes only a fraction of 360°. This phase shift can be calculated and employed for correction of the assumed distance value. The calculation of the phase shift during a sweep takes place in the calculating unit 18, and to that end the low-pass-filtered signals are digitally converted in the A/D converters 25 and 26. Those converters are clocked with sampling pulses which are formed from the reference pulses from the pulse former 16 by dividing their frequency $Af_r$ by a constant K in the division circuit 27.

Purely mathematically, the described method for producing the control frequency implies that the result is not influenced by how the frequency of the microwave oscillator changes during a sweep, provided only that the change takes place monotonally as that term is defined above. From a practical standpoint (among other things, the filter 14), operation with a linear frequency variation is preferred.

How the calculation of the height of the level in the tank —that is, the distance H—takes place will now be described. In this it is assumed that during a measuring interval that constitutes a part of a sweep in which both reference and measuring signals are produced, there are M reference pulses in the pulse train from the pulse former 16, defining M/A reference periods, and that during the same time N sampling pulses are obtained, where $N=M/K$. The number M is a fixed integer, so chosen that both M/A and M/K are integers. Typically M can equal 1428. It will be noted that a reference period is the time required for one full oscillation of the reference signal at the frequency $f_r$.

In order for the accuracy to be as great as possible, it is essential that the calculation of phase change be carried out during a whole number of reference periods and that the sampling pulses are not taken from one and the same part of the period of the reference signal. For that reason K should be a prime number (e.g., 17) and the total number M of reference pulses used during a sweep should be large enough so that M is divisible by K to provide a whole number of sampling pulses.

Because the signals to be evaluated vary rather slowly during a sweep, the number of sampling pulses does not have to be very large. The speed of the sweep and the speed of the calculating unit are therefore not critical.

For every sweep there is made an assumption h for the distance H, with guidance from the previous measurement value. Proceeding from that assumption, the whole number Q is determined from the equation $$Q = \left[ \frac{h \cdot Z}{A \cdot L} \right]$$

where Z is the quotient of the pulse frequency fed to the counter 19 divided by the frequency of the control signal out of the memory 20, A is the factor by which the frequency of the reference signal is multiplied in the circuits 15 and 16, and L is the length of the reference line 11. Because the train of reference pulses that issues from the pulse former 16 with a pulse frequency of $A \times f_r$ is frequency multiplied by Q and frequency divided by Z, the output signal from the memory 20 has a frequency $(h/L) \times f_r$, which is to say that it is equal to the expected frequency of the measuring signal.

By multiplication in the D/A converters 21 and 22 and filtering in the low pass filters 23, 24 there are obtained two low frequency signals which are displaced in phase by 90° to one another. After analogue to digital conversion, controlled by the sampling pulses from the division circuit 27, these two signals are designated $S_n$ and $C_n$ in the sine branch and the cosine branch, respectively. From these signals the phase change $\Delta\phi$ between the measuring signal and the control signal from the memory 20 that occurs during a sweep is calculated by determining the phase change that occurs between successive sampling pulses. Between sampling pulse $n-1$ and sampling pulse n, $\Delta\phi$ is definable as $$\Delta\phi_n = \phi_n - \phi_{n-1} = \arctan \frac{S_n C_{n-1} - S_{n-1} C_n}{S_{n-1} S_n + C_{n-1} C_n}$$

Usually $\Delta\phi$ becomes so small that the arctan function can be linearized without loss of accuracy. The total phase change F is accordingly given by $$F = \sum_{n=1}^{N} \Delta\phi_n.$$

F is employed to correct Q and to calculate a correction factor D for the assumed distance value h. In summing $\Delta\phi n$, $\Delta\phi n$ can be multiplied by weight factors to obtain the same advantages that are mentioned in the above mentioned U.S. Pat. No. 4,044,355. The calculated distance H is finally given by:

$$H = h + D = \frac{A \cdot L \cdot Q}{Z} + \frac{A \cdot L \cdot F}{2\pi M}$$

This equation applies in the case where the velocity of propagation is constant and the phase angle $\phi$ between the control signal and the measuring signal accordingly increases linearly. In a pipe, however, the velocity of propagation is not constant but is dependent upon frequency, and consequently the phase $\phi$ will not vary linearly with frequency. The above equation for H can still be used, but with certain modification. For this it is necessary to distinguish between the apparent distance H and the actual physical distance d. The problem is simplified by the assumption that the pipe has a uniform diameter along its entire length and that the length inside the apparatus can be neglected. In that simplified case the phase $\phi$ is given by:

$$\phi = 2d\sqrt{k^2 - k_c^2} - 2kh$$

where k is the wave number ($=2\pi$ divided by the wave length; k is proportional to the microwave frequency) and $k_c$ is the wave number at "cutoff". In this case it is assumed that the propagation length for the microwave signal comprises a pipe that has a diameter such that $k_c$ is equal to 3.68/diameter. The quotient applies if the basic mode of the pipe is employed.

The diameter of the pipe, as mentioned hereinabove, is in practice hard to determine with sufficient accuracy, and therefore $k_c$ and $\phi$ cannot be accurately determined either. If $\phi$ is derived, $k_c$ can however be eliminated from the equation for d. The first and second derivatives of $\phi$ with respect to k become $$\phi' = \frac{2kd}{\sqrt{k^2 - k_c^2}} - 2h$$

$$\phi'' = \frac{-2dk_c^2}{(k^2 - k_c^2)^{1.5}}$$

which, after eliminating $k_c$, gives:

$$d = \frac{\phi' + 2h}{2\sqrt{1 - [k\phi''/(\phi' + 2h)]}}$$

In the linear case, that is, when the velocity of propagation is constant and $\phi$ increases linearly with frequency (wave number), the first derivative $\phi'=$constant and $\phi''=0$. The root expression in the last equation above then becomes 1, and $d=(\phi'+2h)/2$. Thus $\phi'$ can be determined from the second term in the above equation for H.

The shift of k during the effective sweep is $\pi M/AL$, and during a sampling interval $\pi M/ALK$, which signifies that $\phi''$ can be calculated as $$\phi'' = K(\Delta\phi_N - \Delta\phi_1)\left(\frac{AL}{M}\right)^2.$$

Naturally an even more accurate value of $\phi''$ can be calculated by employing all of the $\Delta\phi$ for a more accurate curve matching. For the general case, where $k_c$ is not the same for all parts of the distance, corresponding formulas can be developed. Although the apparatus has been described with both sine and cosine branches comprising the respective mixers-D/A converters 21, 22, an apparatus is conceivable with either solely the sine branch or solely the cosine branch. However, in such a case it is necessary to arrange that the frequency of the reference signal can never become equal to that of the measuring signal, or that the case where the frequency of those two signals is the same can be distinguished from the case where there is no signal.

Instead of the calculations being carried out as above in the blocks 17, 19, 20 and 27, the same functions can be implemented in a microprocessor of conventional type.

The filters 23 and 24 may be digital filters controlled by the sampling pulses issued from the division circuit 27. It will also be apparent that the apparatus designated by blocks 17, 19 and 20 could be implemented in the form of a microprocessor.

What is claimed as the invention is:

1. Method of determining a distance (H) from an antenna to a surface of a solid or fluent material by means of a microwave signal produced in each of a succession of sweeps and having a frequency that changes in only one direction substantially steadily through each sweep, wherein one part of said microwave signal is emitted from said antenna towards said surface, is received after being reflected from said surface and after a propagation time that corresponds to said distance, and as so received is mixed with the microwave signal then being emitted to obtain a measuring signal having a measuring frequency ($f_m$) that is dependent upon said distance (H), and another part of said microwave signal is subjected to a delay corresponding to a known length (L), is received as so delayed, and by mixing with the microwave signal then being generated is converted to a reference signal having a reference frequency ($f_r$) which corresponds to said known length (L) and which is related to said measuring frequency ($f_m$) so that the calculation of said distance (H) can be based upon said known length, said method being characterized by the steps of:

A. for each sweep forming a control signal having a frequency which approximates the expected frequency of the measuring signal during the sweep by
      (1) multiplying the frequency ($f_r$) of the reference signal by a variable whole number (Q) that is selected to be substantially proportional to the quotient of an approximated value (h) for said distance (H) divided by said known length (L) and
      (2) dividing the resultant frequency by a fixed whole number (Z);
   B. comparing said control signal with the measuring signal to determine the phase difference between those compared signals;
   C. determining the value of any change that takes place, through a predetermined part of the sweep, in the phase difference between the control signal and the measuring signal; and
   D. on the basis of the determined value of said change in phase difference, calculating a correction term which, added to said approximated value (h) for said distance (H), gives said distance.

2. The method of claim 1 wherein said predetermined part of the sweep is a measuring interval during which both said measuring signal and said reference signal are being produced, further characterized by:
(1) producing during said measuring interval a plurality of sampling pulses at a frequency which is in a predetermined ratio to the frequency ($f_r$) of said reference signal, thus defining a sampling interval between each pair of successive sampling pulses; and
(2) determining said change in phase difference by
   (a) determining the value of the phase difference for each of a plurality of said sampling intervals during a measuring interval, and
   (b) calculating the weighted average of the respective values of said phase difference that have been determined for said plurality of sampling intervals.

3. The method of claim 1 wherein said control signal is further formed by:
(1) producing pulses at a rate proportional to the value of the frequency ($f_r$) of the reference signal multiplied by said variable whole number (Q);
(2) in repetitive cycles, each consisting of said fixed number (Z) of said pulses, counting said pulses; and
(3) for each pulse so counted in a cycle, issuing at least one output corresponding to the value of a point on a sinusoidal waveform, which point signifies a function of an angle designated by the numerical position of the counted pulse in the cycle, so that the succession of outputs thus produced corresponds to a sinusoidal waveform that can be readily mixed with said measuring signal to provide for detection of said phase difference.

4. The method of claim 3, wherein two outputs are issued for each of said pulses that are counted during a cycle, one of which outputs corresponds to a sine function of said angle and the other of which corresponds to a cosine function of said angle.

5. The method of claim 1 wherein, in forming said control signal, said frequency ($f_r$) of the reference signal is further multiplied by a constant whole-number multiplier (A) before dividing the resultant frequency by said fixed whole number (Z), characterized in that the distance (H) to be determined is obtained as $$H = \frac{A \cdot L \cdot Q}{Z} + \frac{A \cdot L \cdot F}{2\pi M},$$

where L is said known length, Q is said variable whole number, F is the total phase change during said predetermined part of the sweep, A is said whole-number multiplier, Z is said fixed whole number, and M is the number of oscillations of the reference signal having said reference frequency ($f_r$) that occur during said predetermined part of the sweep.

6. The method of claim 2 wherein said measuring interval constitutes a whole number of sampling intervals and a whole number of oscillations of the reference signal having said reference frequency ($f_r$).

7. The method of claim 6 wherein said frequency ($f_r$) of the reference signal, before multiplication by said whole number (Q), is multiplied by a constant whole-number multiplier (A) and converted to a train of reference pulses (of frequency $Af_r$), further characterized in that the quotient of the number of said reference pulses produced during said measuring interval divided by said whole number of sampling intervals during that measuring interval is a prime number (K).

8. Apparatus for measuring a distance (H) between an antenna (6) and a surface (7), comprising a microwave generator (2, 3) for generating a microwave signal which is emitted in each of a succession of sweeps and the frequency of which changes substantially steadily in only one direction through each sweep, said generator (2, 3) being connected with the antenna (6) for emission of the microwave signal towards said surface (7) to be reflected back to the antenna (6) therefrom, a first mixer (4) connected with the antenna (6) and the generator (2, 3) for mixing the signal reflected from said surface with the signal directly emitted from the generator to produce a measuring signal having a measuring frequency ($f_m$) that depends upon said distance (H), means comprising a delay line (11) and a second mixer (5) that are connected with one another and with said generator (2, 3) for producing a reference signal having a reference frequency ($f_r$) that corresponds to a known length (L), and signal processing means for determining a relationship between said measuring frequency ($f_m$) and said reference frequency ($f_r$) and calculating therefrom the value of said distance (H), said signal processing means comprising:

A. means (14, 15, 16) connected with said second mixer (5) for producing a reference pulse train having a reference pulse frequency ($Af_r$) which is a constant whole-number (A) multiple of the reference frequency ($f_r$);
B. means comprising a pulse multiplier (17) and calculating means (18) for producing a calculated whole number (Q) of succesive approximation pulses for each reference pulse, to thus produce approximation pulses at an approximation frequency ($AQf_r$), said calculated whole number (Q) being constant through each sweep and being calculated to be substantially proportional to the quotient of an approximated value (h) for said distance (H) divided by said known length (L);
C. means comprising a counter (19) connected with said pulse multiplier (17) for counting said approximation pulses in cycles, each cycle containing a fixed number (Z) of approximation pulses, and for issuing a binary count output for each counted pulse that designates its numerical sequence in its cycle;
D. memory means (20) connected with said counter (19) for issuing, for each said binary count output, at least one output corresponding to the value of a point on a sinusoidal waveform, which point signifies a function of an angle designated by the numerical position of the corresponding counted approximation pulse in its cycle, so that the succession of outputs from said memory means corresponds to a sinusoidal waveform and constitutes a control signal that can be readily compared with said measuring signal; and
E. mixing means connected with said memory means (20) and with said first mixer (4) for so mixing said control signal with said measuring signal that the phase difference between those mixed signals can be measured at intervals during each sweep.

9. The apparatus of claim 8 wherein said mixing means connected with said memory means and with said first mixer comprises a D/A converter.

10. Method of measuring a distance (H) between an antenna (6) and a surface (7) by means of a microwave signal which is generated in each of a succession of sweeps and the frequency of which changes substantially steadily in only one direction through each sweep, wherein one part of said microwave signal is emitted from said antenna (6) towards said surface (7), is received after being reflected from said surface and after a propagation time that corresponds to said distance, and as received is mixed with the microwave signal then being generated to produce a measuring signal having a measuring frequency ($f_m$) that depends upon said distance (H), and another part of said microwave signal is subjected to a delay corresponding to a known length (L) and as so delayed is mixed with the microwave signal then being generated to produce a reference signal having a reference frequency ($f_r$) that corresponds to said known length (L), said method being characterized by:

A. by digitizing said reference signal during each sweep, producing a pulse train for the sweep that has a pulse frequency ($Af_r$) which is a constant whole-number (A) multiple of the reference frequency ($f_r$);

B. by pulse multiplication producing for each pulse in said pulse train a succession of approximation pulses, the number of approximation pulses in each said succession being equal to a calculated whole number (Q) which is uniform through the sweep and which is selected to be substantially proportional to the quotient of an approximated value (h) for said distance (D) divided by said known length (L);

C. in repetitive cycles, each consisting of a fixed number (Z) of approximation pulses, counting said approximation pulses; and D. for each approximation pulse so counted in a cycle, issuing at least one output corresponding to the value of a point on a sinusoidal waveform, which point signifies a function of an angle designated by the numerical position of the counted pulse in its cycle, so that the succession of outputs thus produced corresponds to a sinusoidal waveform that can be readily mixed with said measuring signal to provide for detection and measuring of phase differences and changes in phase difference between said waveform and the measuring signal.

11. The apparatus of claim 8 wherein said means (14, 15, 16) connected with said second mixer (5) for producing a reference pulse train comprises:

(1) two cascaded 120°-degree phase shifters (15a, 15b) connected with said second mixer (5) to produce a three-phase triplet;

(2) six voltage comparators (16a–16f) connected with the second mixer (5) and with said phase shifters (15a, 15b) to compare the voltage of each triplet component
 (a) with a reference voltage and
 (b) with the voltage of each of the other triplet components,
each of which comparators thus produces an output that alternates between one value and another value;

(3) an even/odd logic device (16g) connected with said voltage comparators (16a–16f) to produce
 (a) an output of one state when the outputs of an even number of said voltage comparators (16a–16f) are of said one value and
 (b) an output of another state when the outputs of an odd number of said voltage comparators (16a–16f) are of said one value; and (4) a pulse former (16h) connected with said even/odd logic device (16g) for producing a short pulse for each each change of state of the output of the even/odd logic device (16g).

* * * * *